Figure 1:
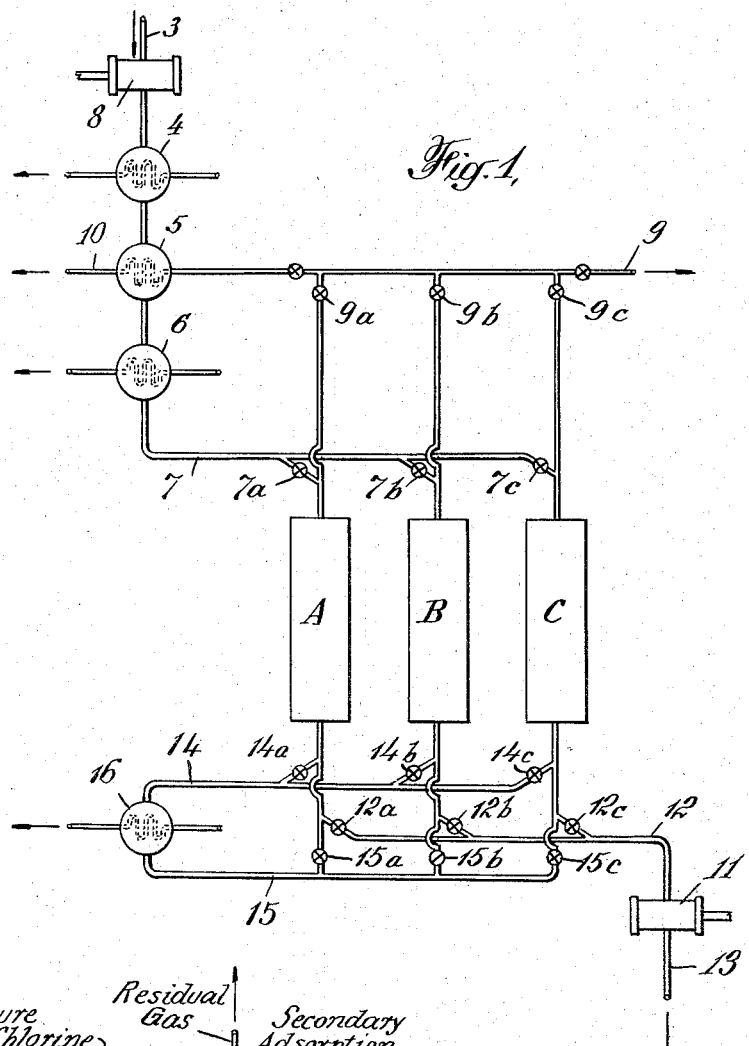

Feb. 1, 1944.　　R. B. MacMULLIN　　2,340,398
CHEMICAL MANUFACTURE
Filed March 21, 1942

INVENTOR
Robert B. MacMullin
BY
ATTORNEYS

Patented Feb. 1, 1944

2,340,398

UNITED STATES PATENT OFFICE 2,340,398

CHEMICAL MANUFACTURE

Robert B. MacMullin, Niagara Falls, N. Y., assignor to The Mathieson Alkali Works, Inc., New York, N. Y., a corporation of Virginia Application March 21, 1942, Serial No. 435,643

4 Claims. (Cl. 183—114.2)

This invention relates to improvements in the separation and recovery of chlorine from gas mixtures containing chlorine. The invention relates particularly to improvements in separation and recovery operations in which chlorine is adsorbed from the gas mixture on silica gel and the adsorbed chlorine is then separated from the silica gel under a lower pressure than that prevailing during adsorption while the temperature level is maintained low enough to provide a useful margin of adsorptive capacity over the pressure differential used. The invention provides improvements in chlorine recovery and in an internally balanced cycle of operation.

In carrying out such operations, separate charges of the silica gel are successively used for adsorption of chlorine from the gas mixture and are then subjected to desorption to separate the recovered chlorine and to make the charge of gel again available for the adsorption step. The adsorption may be carried out in two or more stages by passing the gas mixture successively through two or more charges of gel advanced at regular intervals in countercurrent to the gas mixture and then subjected to desorption. During adsorption, the temperature of the charges of gel tends to rise due to the heat of adsorption and during desorption the temperature of the charges of gel tends to drop due to the heat of vaporization of the chlorine. The effective adsorptive capacity of the silica gel, and consequently the recovery of chlorine, is limited by the temperature rise due to the heat of adsorption as well as by the adsorbed chlorine. To balance the cycle of such operations, the quantity of chlorine removed in the adsorption step must correspond to that recovered in the desorption step and the net temperature increase of the gel during adsorption must correspond to the net temperature decrease of the gel during desorption. While refrigeration can be used to lower the general level of temperature of the operation, the low thermal conductivity of silica gel renders indirect heat exchange ineffective as a practical means of removing heat from a charge of gel. The present invention provides an internal thermal balance which is not impeded by the low conductivity of the silica gel and permits improved recovery of chlorine in such operations.

According to this invention, the gas mixture containing chlorine is passed successively through silica gel in a primary adsorption step, then through a cooler, and then through silica gel in a secondary adsorption step. The gel charged with adsorbed chlorine is transferred from the primary step to a desorption step in which chlorine is vaporized from the gel by reducing the pressure and the gel is cooled, by vaporization, substantially to a temperature at which the gel is transferred to the primary step. The gel partially charged with chlorine adsorbed in the secondary step is transferred to the primary step to replace that transferred to the desorption step. The gel from which chlorine has been separated in the desorption step is transferred to the secondary step to replace that transferred to the primary step. The gas mixture passing from the primary step to the secondary step is cooled, in the cooler previously mentioned, sufficiently to maintain the temperature of the gel transferred from the secondary step to the primary step substantially that of the gel transferred from the desorption step to the secondary step. An improved recovery of chlorine is effected in this secondary adsorption step. Also, the cycle of operation is internally balanced, making the operation truly cyclic, in a manner which eliminates the low thermal conductivity of the silica gel as an impediment to the heat exchanges involved. Heat exchanges within the charges of gel are effected, in accordance with this invention, by the adsorption of chlorine, by the vaporization of chlorine, and by the gas mixture itself passing through the gel. All thermal factors with respect to which the distribution of the heat exchange medium and the heat to be absorbed are liberated are substantially coextensive except for the cooling of the gas mixture passing from the primary adsorption step to the secondary adsorption step. The cooling of the gas mixture at this point by conventional indirect heat exchange involves no technical difficulties and does not involve the low conductivity of the silica gel. The operation is with advantage carried out with a series of separate charges of silica gel which are at regular intervals transferred as such from the desorption step to the secondary adsorption step, then to the primary adsorption step and then back to the desorption step, each charge of gel leaving the desorption step at a temperature corresponding to the initial temperature of the charge at the beginning of each primary adsorption step in the cycle and passing through the secondary adsorption step without substantial change in temperature. The residual gas mixture leaving the secondary adsorption step may be used, in indirect heat exchange, to cool the gas mixture supplied to the primary adsorption step.

The invention will be further described in connection with the accompanying drawing which illustrates, diagrammatically and conventionally, one embodiment of the practice of the invention. In the drawing, Fig. 1 illustrates apparatus for carrying out the cycle of operation constituting the invention and Fig. 2, as a flow diagram, illustrates one of the cyclically repeated stages of operation.

Referring to the drawing: the chlorine-containing gas mixture supplied through connection 3 is forced through coolers 4, 5 and 6, connection 7 and two of the three absorbers A, B and C charged with silica gel by means of compressor 8. After passing through the second absorber, the residual gas mixture is either discharged through connection 9 or through cooler 5 and connection 10. The cooler 4 may be supplied with cooling water and the cooler 6 may be supplied with chilled brine or other appropriate refrigerant, for example. The adsorbed chlorine is vaporized from one of the three absorbers A, B and C by means of exhauster 11 through connection 12, the recovered chlorine being discharged through connection 13. After leaving the first of the two absorbers through which it passes and before entering the second, the gas mixture supplied through connection 7 passes, by means of connections 14 and 15, through cooler 16. The cooler 16 may be supplied with chilled brine or other appropriate refrigerant, for example. The several connections 7, 14, 15, and 9—10 are manifolded to the three absorbers to permit the transfer, stage by stage as the cycle of operation proceeds, of the charge of silica gel in each absorber to the next step of the operation. The compressor 8 and the exhauster 11 may each be compounded and provided with intercoolers as in conventional practice. If the concentration with respect to chlorine of the gas mixture supplied through connection 3 is so high that condensation of chlorine occurs during passage through the coolers 4, 5 and 6, provision may be made for separation of condensed chlorine from the gas mixture before the gas mixture reaches the absorbers. The several absorbers A, B and C may be thermally insulated and may be provided with refrigerated jackets to reduce the general temperature level at which the operation is carried out.

Figure 2:
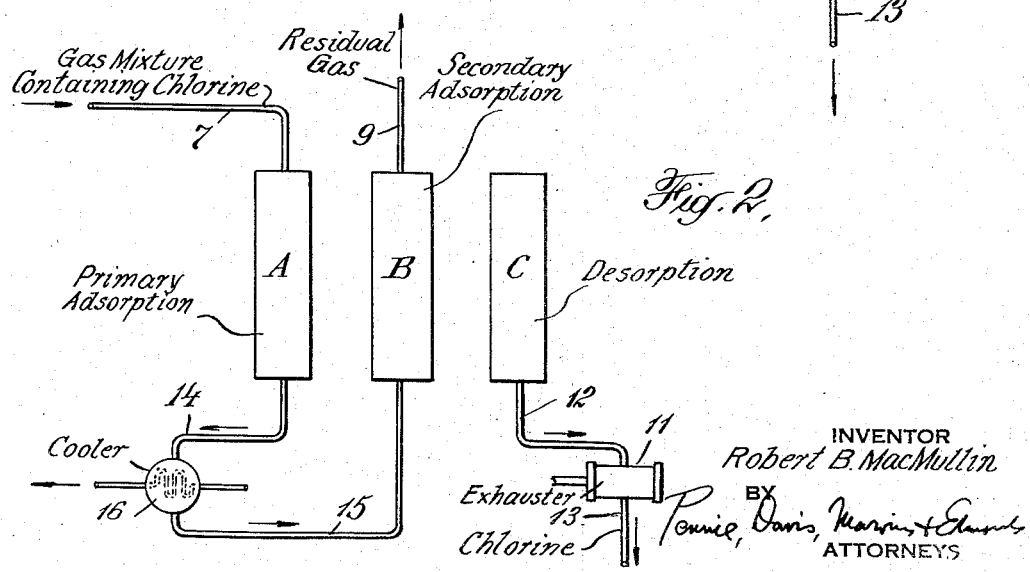

In initiating operation in the illustrated equipment, for example, the valves 7a, 9b, 14a, 15b and 12c are opened and the valves 7b, 7c, 9a, 9c, 14b, 14c, 15a, 15c, 12a and 12b are closed. The operating situation of the absorbers A, B and C will then be as illustrated in Fig. 2. In this situation, the chlorine-contining gas mixture may be supplied to absorber A under a pressure of from 2 to 10 atmospheres and may be discharged from absorber B at a pressure corresponding with the supply pressure and the pressure differential due to the flow through the absorbers A and B and the cooler 16. The absorber C may be brought, during desorption, to a pressure of from 0.1 atmosphere to about 1 atmosphere, for example. As the adsorption of chlorine by the charge of silica gel in absorber A proceeds, the temperature of this charge of gel rises from a temperature $T_1$ to a temperature $T_2$. As a consequence of the desorption, the temperature of the charge of gel in absorber C is brought from the temperature $T_2$ to the temperature $T_1$. The charge of gel in absorber B is separating additional chlorine from the gas mixture leaving absorber A, but in this secondary adsorption step the mean temperature of the charge of gel is maintained substantially at $T_1$ by cooling, in the cooler 16, the gas mixture leaving the absorber A before it enters the absorber B to a temperature $T_3$ such that the residual gas mixture leaving the absorber B will carry away sufficient heat to maintain this temperature. When the charge of gel in absorber A reaches a temperature of $T_2$ and the charge of gel in absorber B reaches a temperature of $T_1$, valves 7a, 9b, 14a, 15b and 12c are closed and valves 7b, 9c, 14b, 15c and 12a are opened and the operation is repeated, the charge of gel in the absorber A being brought to a temperature of $T_1$ and the charge of gel in absorber B being brought to a temperature of $T_2$ while the charge of gel in the absorber C is maintained at a temperature of $T_1$ in this stage. In the stage of operation first described, the primary adsorption is carried out in absorber A, the secondary adsorption in absorber B and the desorption in absorber C, and in the second stage of operation the primary adsorption is carried out in absorber B, the secondary adsorption in absorber C and the desorption in absorber A, the change in position of the control valves between the first and second stages amounting to a transfer of the charge of gel from the desorption step to the secondary adsorption step, from the secondary adsorption step to the primary adsorption step and from the primary adsorption step to the desorption step. In the third stage of operation, the primary adsorption is carried out in absorber C, the secondary adsorption in absorber A and the desorption in absorber B, and the succeeding stages of operation continue in the same manner. The general temperature level at which the operation is carried out may be fixed by fixing the temperature $T_4$ at which the chlorine-containing gas mixture is supplied to the primary adsorption step, or by controlling this temperature $T_4$ and the temperature of the environment of the several absorbers, for example by refrigerated jackets. This temperature $T_4$ is controlled so that the temperature rise in the primary adsorption step equals the temperature fall in the desorption step.

The several temperatures just designated $T_1$, $T_2$, $T_3$ and $T_4$ may vary considerably in varying applications of the invention, particularly with varying concentrations of chlorine in the gas mixture from which it is to be separated and recovered. In general, the initial temperature of the charge of gel in the primary adsorption step is with advantage not higher than about 10° C., or better 0° C. or lower, this being the temperature previously designated $T_1$. The temperature to which the gas mixture is cooled between the primary adsorption step and the secondary adsorption step, the temperature previously designated $T_3$ is lower than this initial temperature. The final temperature to which the charge of gel is brought in the primary adsorption may be as high as 35°–40° C., or even higher, any chlorine escaping unadsorbed at this temperature being separated from the gas mixture in the secondary adsorption. As applied to the separation and recovery of chlorine from gas mixtures containing from about 10% to about 35% (by volume) chlorine, for example, the temperature $T_1$ may approximate −20° C., −25° C., for example, the temperature $T_2$ may approximate 25° C., 40° C., for example, the temperature $T_3$ may approximate −25° C., −37° C., for example, and the temperature $T_4$ may approximate $-10°$ C., $-25°$ C., for example, with working pressures ranging from 10 atmospheres in the primary adsorption step to 0.1 atmosphere in the desorption step.

The chlorine recovered from the desorption step may, for example, be liquefied in any conventional manner. The process of this invention is applicable to gas mixtures containing chlorine in concentrations ranging from as little as 10% or less to as much as 50% and more, even to concentrations of the order of 90%. As applied to gas mixtures containing chlorine in low concentration, the invention is particularly advantageous because of the high recoveries it provides. As applied to gas mixtures containing chlorine in high concentration, the invention is particularly advantageous because of the balanced cycle of operation it provides notwithstanding the substantial heat exchanges involved as a consequence of the high heat of adsorption of chlorine on silica gel.

I claim:

1. In the recovery of chlorine from gas mixtures containing the same, the improvement which comprises passing the gas mixture successively through silica gel in a primary adsorption step, a cooler, and silica gel in a secondary adsorption step, transferring gel charged with chlorine from the primary step to a desorption step, vaporizing chlorine from the gel in the desorption step by reducing the pressure and thereby cooling the gel substantially to the temperature at which the gel is transferred to the primary step, transferring gel partially charged with chlorine from the secondary step to the primary step to replace that transferred to the desorption step, transferring gel from the desorption step to the secondary step to replace that transferred to the primary step, and cooling the gas mixture passing from the primary step to the secondary step sufficiently to maintain the temperature of the gel transferred from the secondary step to the primary step substantially that of the gel transferred from the desorption step to the secondary step.

2. In the recovery of chlorine from gas mixtures containing the same, the improvement which comprises subjecting the gas mixture to a first treatment with a first charge of silica gel at a temperature increasing from an initial temperature to a higher temperature, cooling the gas mixture from that treatment and subjecting it to a second treatment with a second charge of silica gel at a temperature approximating said initial temperature, subjecting a third charge of gel to desorption by reducing the pressure and thereby cooling the gel to said initial temperature, transferring the second charge of gel to the first treatment, transferring the third charge to the second treatment and transferring the first charge to the desorption.

3. In the process of claim 1, the improvement which comprises passing the gas mixture from the secondary adsorption step in indirect heat exchange with the gas mixture supplied to the primary adsorption step.

4. In the process of claim 1, the improvement which comprises controlling the temperature at which the chlorine-containing gas mixture is supplied to the primary adsorption step so that the temperature rise in that step equals the temperature fall in the desorption step.

ROBERT B. MacMULLIN.